Patented Sept. 1, 1925.

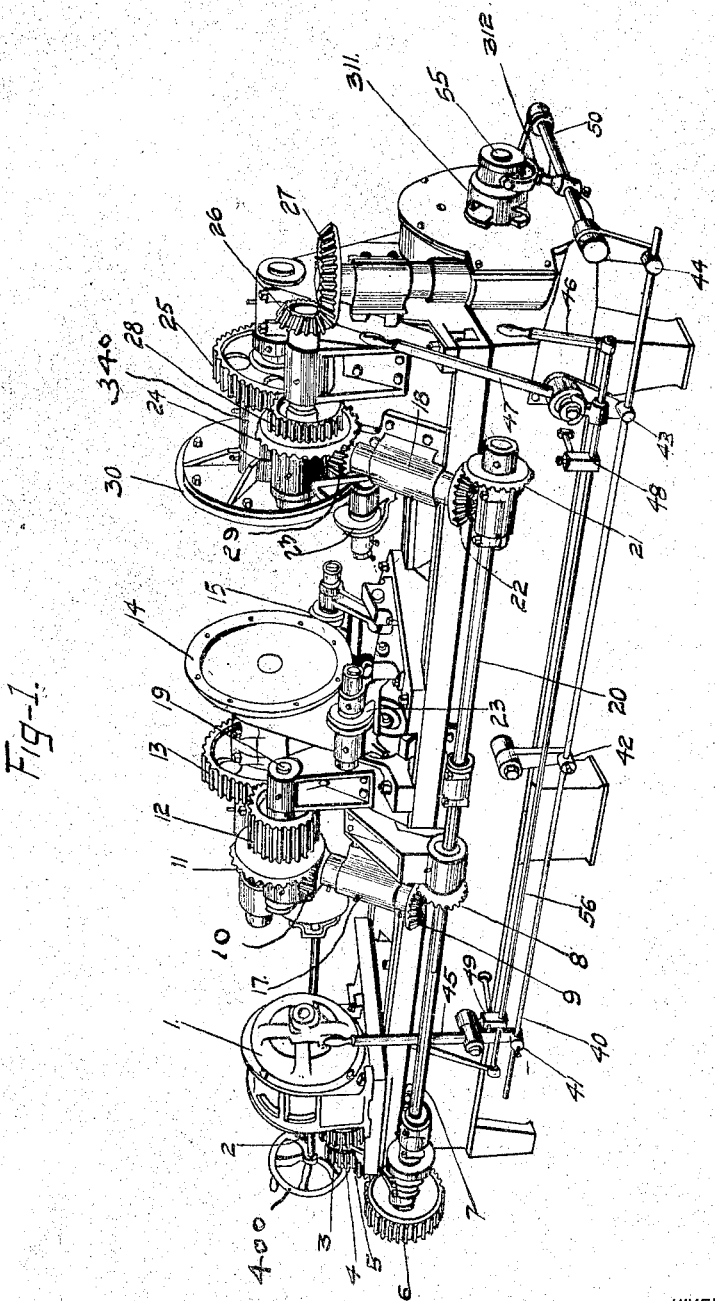

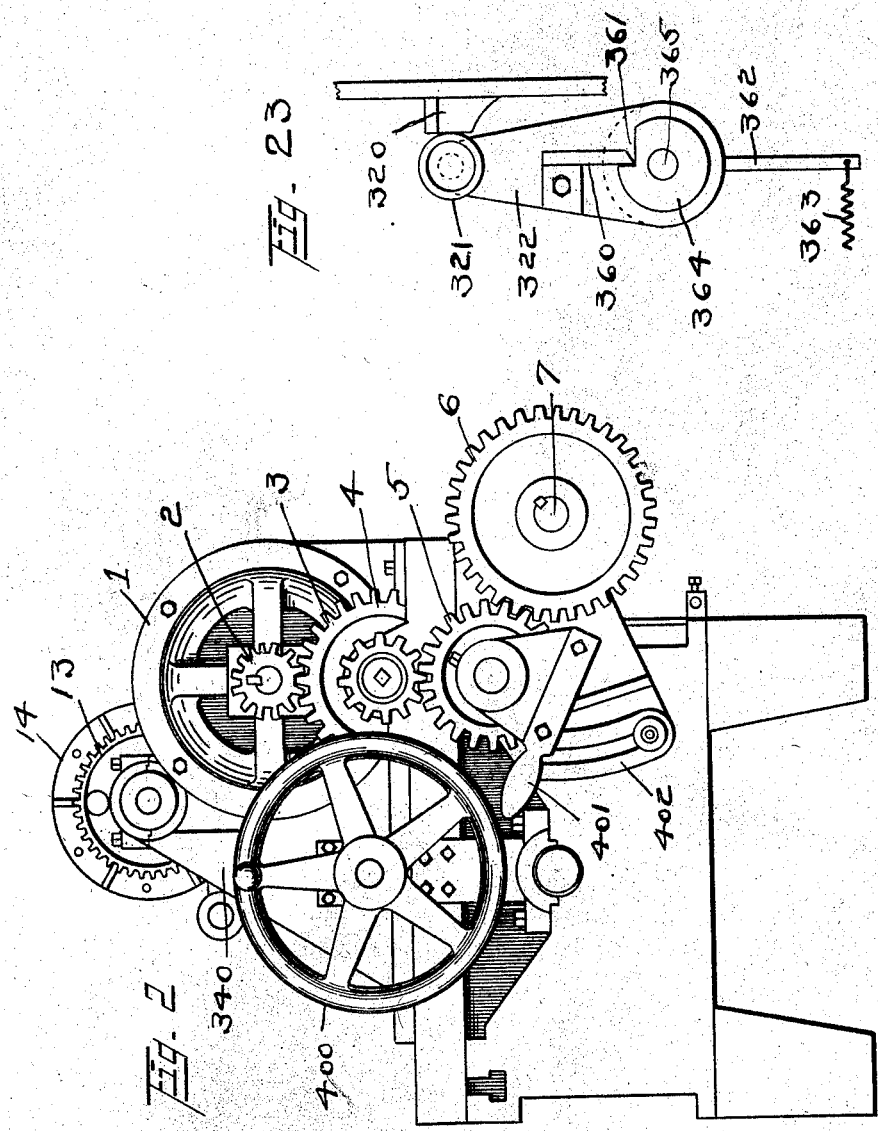

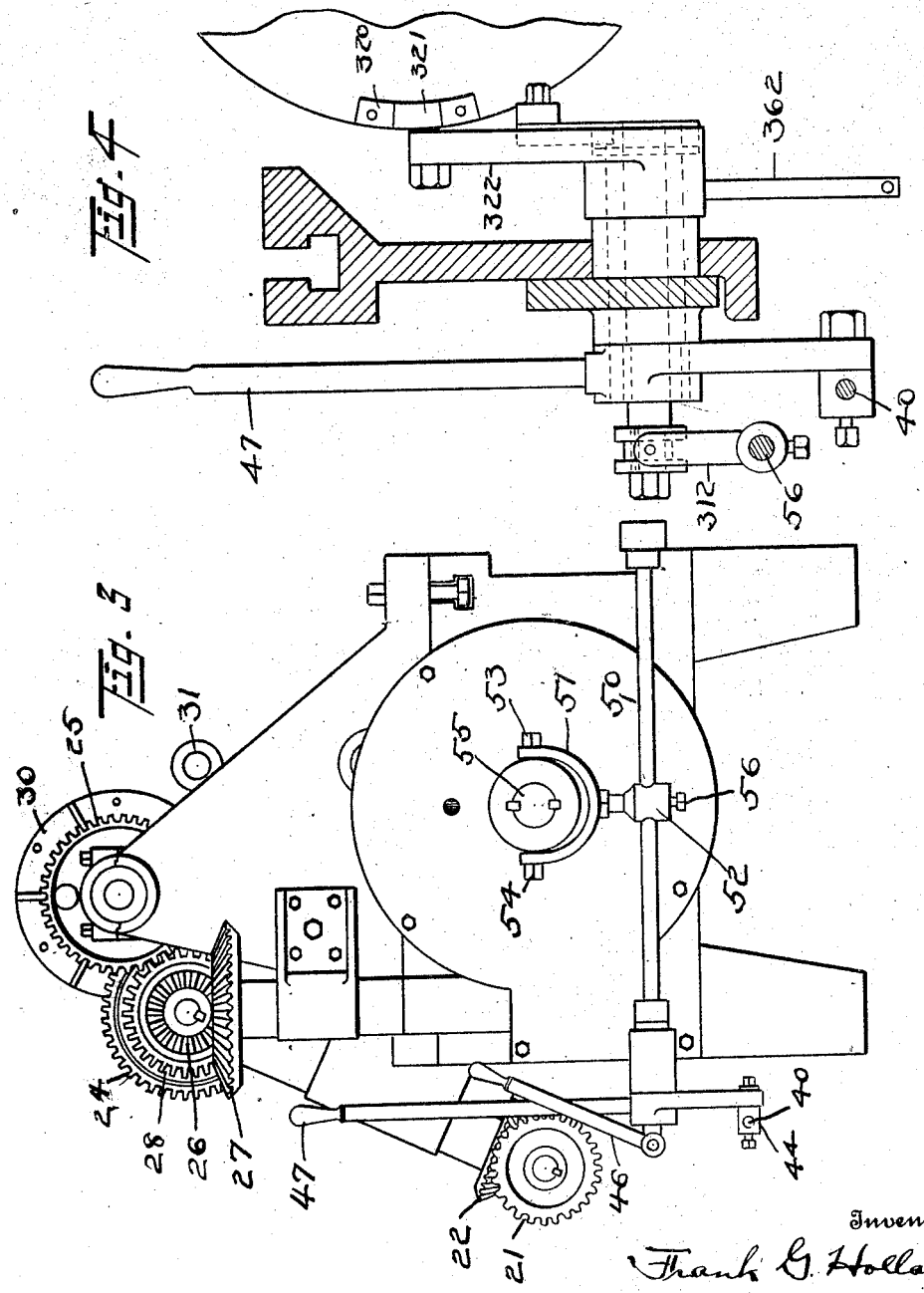

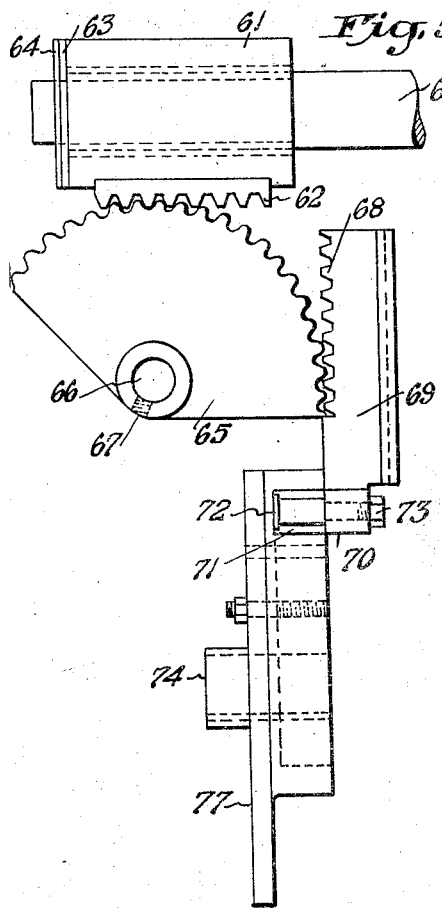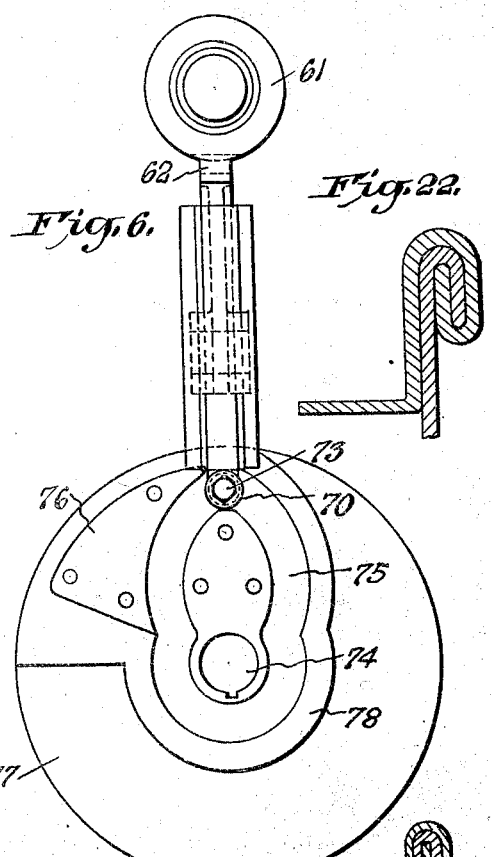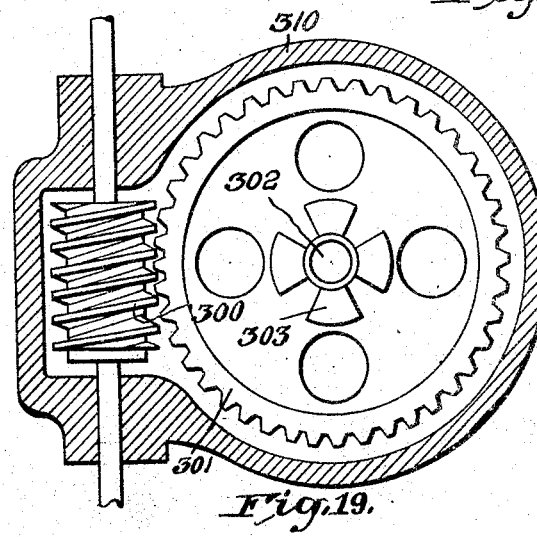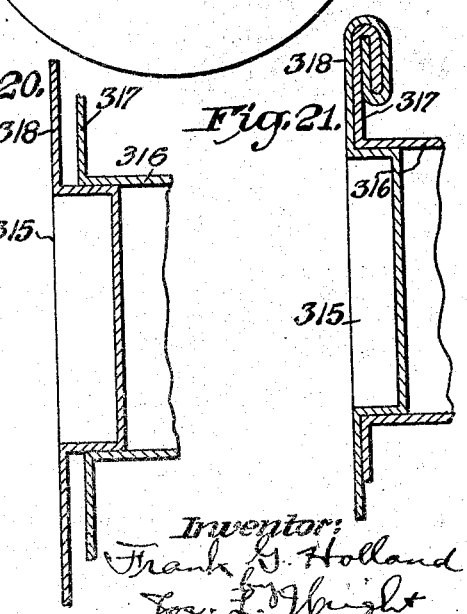

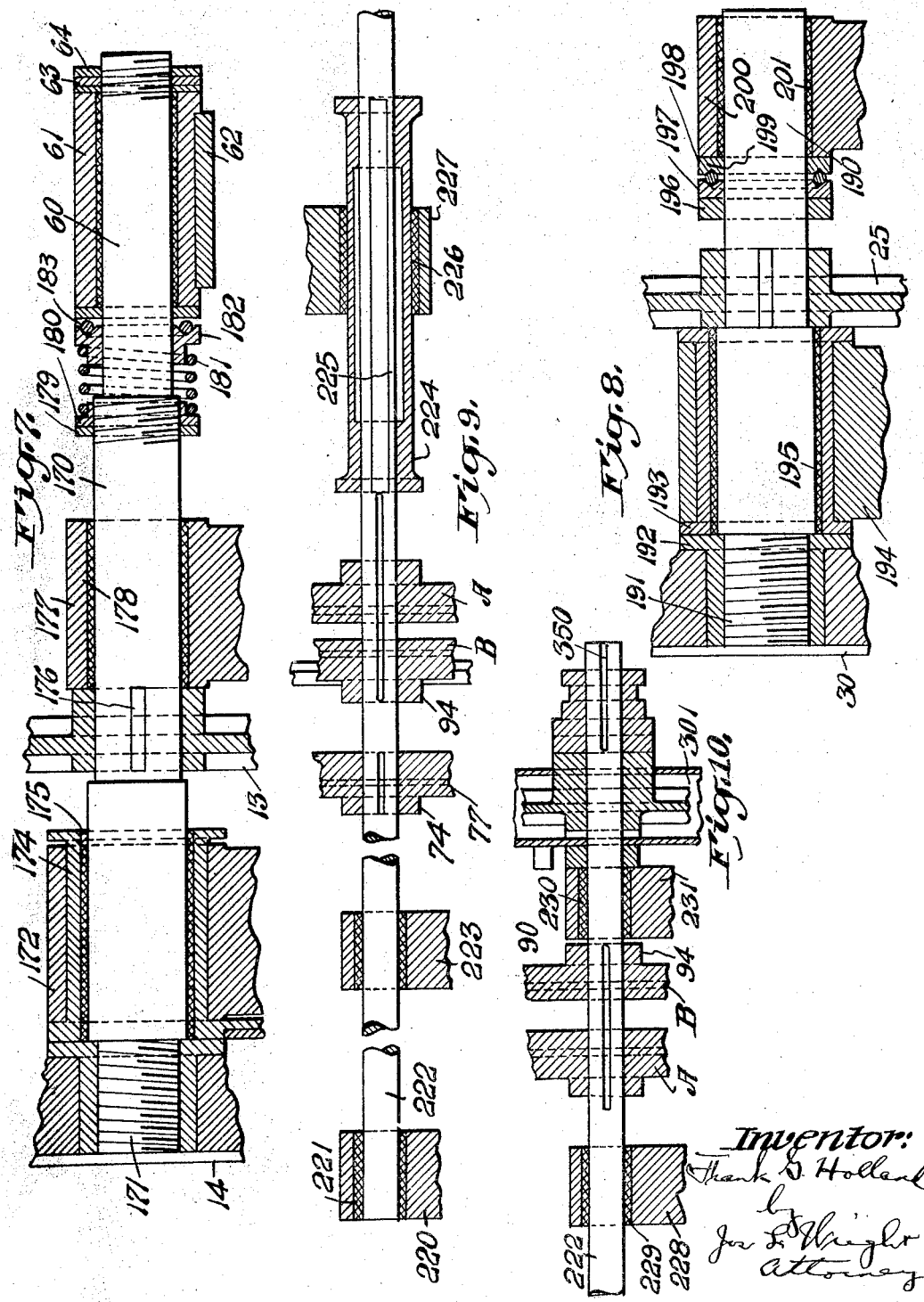

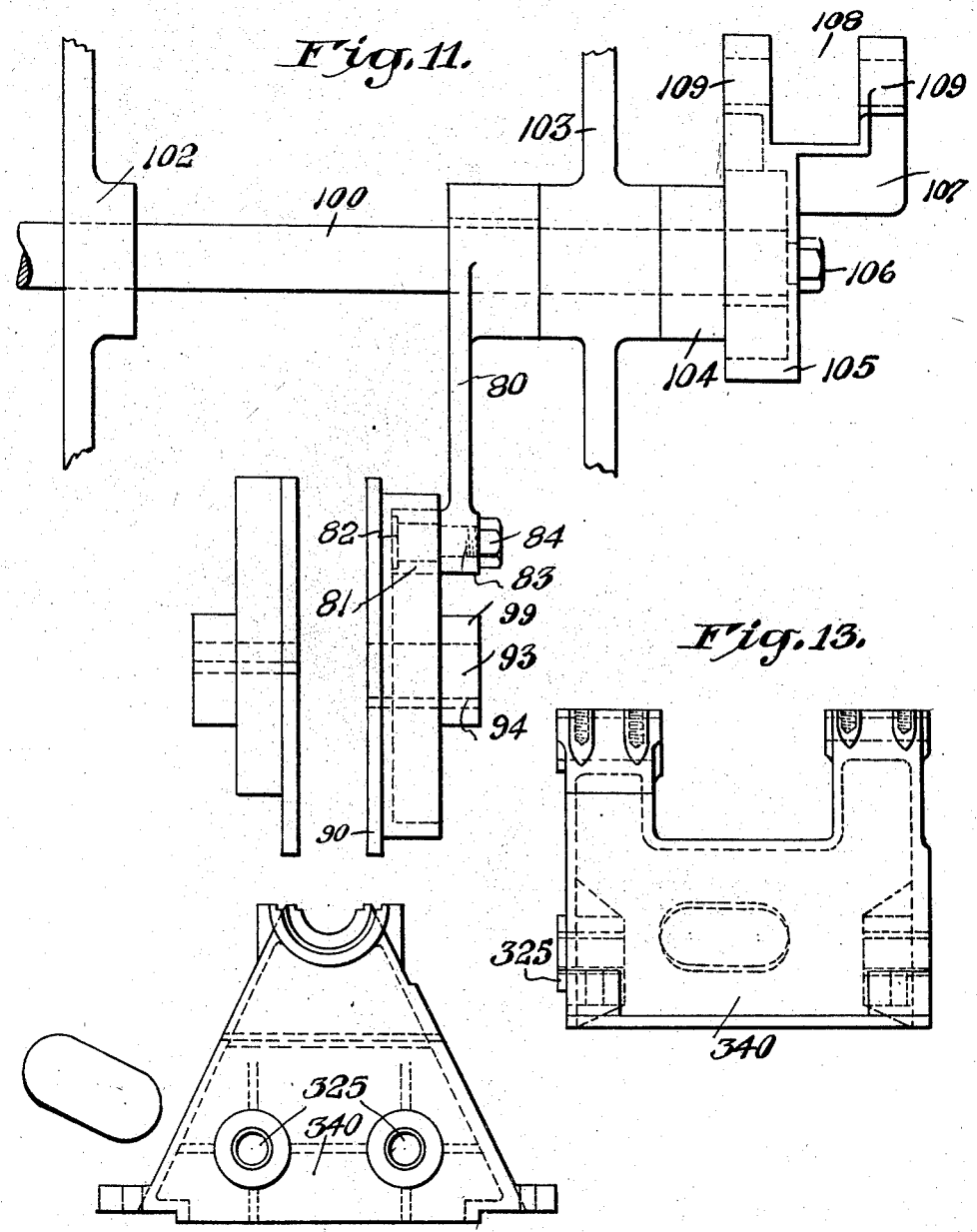

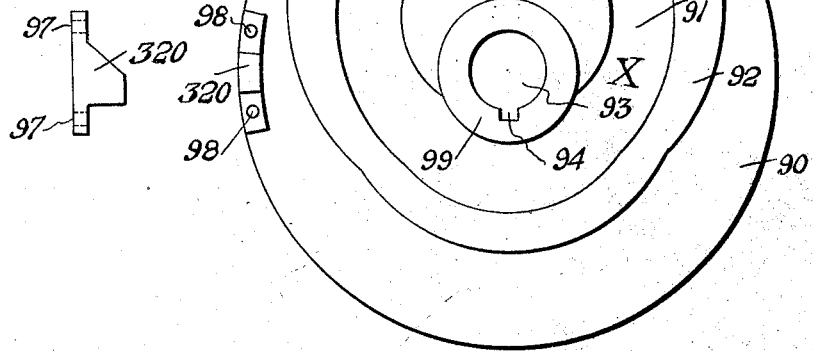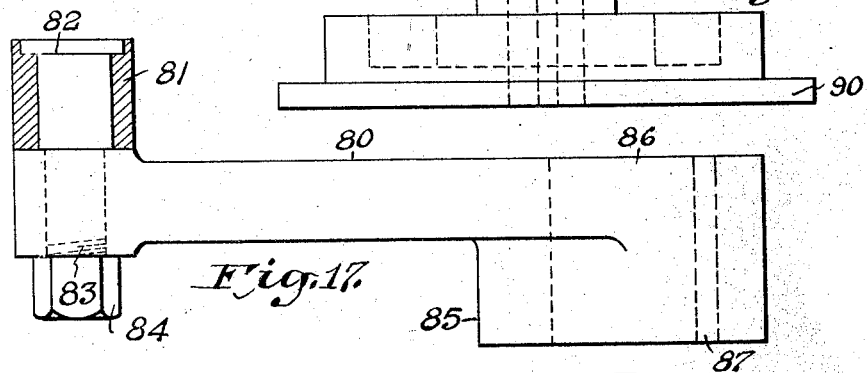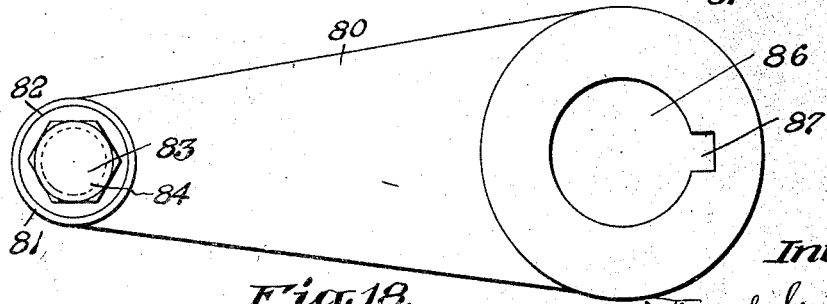

1,551,955

UNITED STATES PATENT OFFICE.

FRANK G. HOLLAND, OF CLEVELAND, OHIO, ASSIGNOR TO REPUBLIC STEEL PACKAGE COMPANY, OF CLEVELAND, OHIO, A CORPORATION OF OHIO.

BARREL HEADING AND SEAMING MACHINE.

Application filed March 2, 1922. Serial No. 540,423.

*To all whom it may concern:*

Be it known that I, FRANK G. HOLLAND, a citizen of the United States, residing at Cleveland, in the county of Cuyahoga and State of Ohio, have invented certain new and useful Improvements in a Barrel Heading and Seaming Machine, of which the following is a specification.

My invention relates to improvements in barrel heading and seaming machines.

The object of my invention is the design of a machine automatic in its action for heading and seaming the two ends or heads of a metallic barrel or receptacle at the same time.

The machine is provided with two heads which are normally constantly rotating, one of said heads having a longitudinal movement automatic in its operation for clamping and releasing a barrel. During the heading or seaming operation the movable head advances towards the fixed head and firmly holds the barrel during the seaming operation. After the seaming operation the movable head automatically retracts and disengages the barrel.

The machine is provided with two rollers for each head. One of each set of rollers is arranged for forming the bead on the heads of the barrel, while the remaining rollers are for the purpose of flattening the bead. When the machine is idle, that is to say, when the two heads are revolving and the movable head in its retracted position the rollers are idle or placed in an inoperative position.

When the machine is to be placed in operation the barrel is placed between the two heads after which the movable head moves toward the fixed head and firmly clamps the barrel and causes it to rotate with the heads. The next operation which is automatic causes the seaming or beading roller of each head to move into engagement with its respective barrel head. The result of this engagement is to turn or form a bead on the heads of the barrel. After a certain number of revolutions the two beading or seaming rollers automatically withdraw from engagement with the barrel and two flattening rollers automatically advance and engage the heads of the barrel.

While in engagement these two rollers flatten out the seam or bead so as to hermetically seam the heads of the barrel. After this flattening operation the flattening rollers automatically disengage the barrel and the movable head retracts and leaves the barrel in position to be removed from the machine. When the movable head retracts the operating part of the two sets of rollers come to rest.

Each roller is provided with a rotating cam driven by an auxiliary shaft which is drawn into engagement with the driving shaft and when in engagement the auxiliary shaft rotates and causes the operation of the cams and rollers in proper sequence. The movable head is likewise provided with a rotatable cam operated by the auxiliary shaft.

Other features of my invention will be pointed out in the detailed description to follow:

My invention is illustrated in the accompanying drawings wherein:

Figure 1 is a perspective view of the machine.

Figure 2 is an end view of the machine.

Figure 3 is a view of the machine from the opposite end.

Figure 4 is a detail of the mechanism for starting and stopping the operation of the machine.

Figure 5 is a detail of the mechanism for controlling the movable head.

Figure 6 is an end view of Figure 5.

Figure 7 is a sectional view of the shaft and parts controlling the movable head.

Figure 8 is a sectional view of the shaft and parts for controlling the fixed head.

Figure 9 is a portion in section of the auxiliary shaft and the co-operating part mounted thereon.

Figure 10 is a continuation of Figure 9.

Figure 11 is a detail showing the general arrangement of the cams and rollers.

Figure 12 is an end view of the support for the set of rotating cams for operating a set of rollers.

Figure 13 is a front view of Figure 12.

Figure 14 is a front view of one of the cams for operating the flattening roller.

Figure 15 is a detail of the cam or tripping device mounted upon the cam of Figure 14.

Figure 16 is a side view of Figure 14.

Figure 17 is a side view of the lever arm for one of the roller cams.

Figure 18 is a top view of Figure 17.

Figure 19 is a view showing the worm gear and cam arangement for operating the auxiliary shaft.

Figure 20 is a sectional view of the barrel and cover before the seaming process.

Figure 21 is a sectional view of the barrel and head after the seaming and flattening process.

Figure 22 is a sectional view of the seam before the flattening process.

Figure 23 is a detail of the mechanism controlled by the handle 46.

Referring first to Figures 1, 2 and 3 it will be noted that the machine comprises a frame which supports the controlling mechanism. The mechanism is operated by means of a motor 1, which is provided with the gear 2, mounted upon the motor shaft. Gear 2 engages gear 3, the latter gear being mounted upon the shaft with the gear 4. Gear 4 engages gear 5 which in turn engages gear 6 mounted upon the main driving shaft 7. The gears are properly proportioned so as to give the required speed to the various operating parts. The engagement of the gears to which reference has been made is plainly shown in Figure 2.

The main shaft 7 is supported by means of suitable brackets attached to the front of the frame as shown in Figure 1. The shaft is provided with mitre gears 8 and 21, the former serving to drive or cause the rotation of the movable head 14, while the latter serves to cause the rotation of the fixed head 30. The gear 8 engages a similar gear 9 mounted upon a shaft or bearing supported by a bracket or housing 17 as shown in Figure 1. The shaft extends through the housing and is provided with the mitre gear 10 which engages a similar gear 11. The gear 11 is mounted upon a shaft 19 as shown in Figure 1. Firmly attached to the shaft and moving with the gear 11 is the gear 12 which meshes with the gear 13. The gear 13 and the head 14 are mounted upon the same shaft. This shaft is capable of longitudinal movement so that the head 14 can be advanced toward the fixed head 30.

The gear 21 engages a gear 22 which is provided with the bearing or housing 18 as shown in Figure 1. The shaft upon which the gear is mounted extends through the housing and is provided with a mitre gear 29 which engages a similar gear 24. The gear 24 together with gear 28 are mounted upon the same shaft and firmly attached thereto, the shaft being supported by brackets as shown in Figure 1. The gear 28 engages gear 25 which is mounted upon the same shaft with the fixed head 30.

Mounted upon the same shaft with the gears 24 and 28 is a mitre gear 26 which engages a similar gear 27. The shaft containing the gear 27 extends within a casing as shown in Figure 2. The end of the shaft is provided with a worm which engages a suitable worm gear attached to the shaft 55. The co-operation of these parts are shown in Figure 19.

The shaft 55 constantly rotates and is provided with clutch mechanism for co-operating with the auxiliary shaft 222 Figs. 9 and 10 which controls the operation of the rolls 15 and 23. The machine is provided with two controlling handles 46 and 47 shown in Figures 1, 3 and 4. These handles are for the purpose of causing the clutch mechanism of the shaft 55 to engage and cause the operation of the auxiliary shaft upon which are mounted the cams for causing the operation of the rolls. Mounted upon the same auxiliary shaft is a cam for controlling the longitudinal movement of the head 14. Details of this control are shown in Figures 5 and 6. In all there are five cams mounted upon the auxiliary shaft, one for each of the rolls 15 and 23 and one for the movable head 14.

As shown in Figures 1, 2 and 3 the heads 14 and 30 together with their controlling mechanism are constantly operating while the four rolls 15 and 23 and their respective cams together with the cam for causing the longitudinal movement of the head 14 are at rest. These latter parts are only placed in operation when the shaft 55 is brought into co-operation with the auxiliary shaft 222. The levers 46 and 47 serve to cause the initial operation of the various cams mounted upon the auxiliary shaft after which the remaining functions are automatically performed.

The barrel is placed between the two heads 14 and 30. The arrangement of the heads and barrel is shown in Figures 20 and 21.

When it is desired to cause the operation of the rolls the handle 46 is moved toward the machine in order to disengage the throwout clutch which will be explained later, after which the handle 47 is pressed forward toward the end of the machine containing the motor 1. The operation of the latter handle causes the clutch mechanism of the shaft 55 to engage the mechanism of the auxiliary shaft containing the five cams. The operation of the cam for the head 14 causes the head to move forward and tightly engage the head of the barrel and force the opposite end of the barrel into engagement with the head 30. The two forming or first operation rolls 15 then move toward their respective heads 14 and 30 and engage the head of the barrel forming the bead shown in Figure 21. After a certain number of rotations of the barrel the rolls 15 by means of their controlling cams disengage the head of the barrel and at the same time the flattening or second operation rolls 23 move toward and engage the head of the barrel and flatten out the bead formed by the rolls 15.

After certain number of rotations of the barrel the rolls 23 disengage the heads of the barrel and the movable head 14 retracts and allows the barrel to be removed from the machine.

The details in the operation of the clutch mechanism for driving the auxiliary shaft 222 and the operation of the various rolls and the movable head will now be explained.

As shown in Figure 7 the movable head 14 is threaded and mounted upon the shaft 170. Interposed between the head and the bearing or support 172 is a locking nut 173 and a shoulder of the sleeve 174. Mounted upon the same shaft with the head 14 is a gear 13. This gear is placed next to the bearing or support 177. Upon the reduced portion of the shaft 60 is mounted the rack 62 and its support or sleeve 61. This sleeve or support is held in place by the locking or adjustment nuts 63 and 64. Interposed between the nut 63 and the support 61 is a thrust washer preferably made of bronze. The shaft 170 as shown is threaded and provided with the two adjusting nuts 179 and 180. Mounted upon the shaft 60 is the thrust bearing 182 having a ball bearing as shown at 183. Interposed between the thrust bearing 182 and the nut 180 is a spiral spring for causing a yielding effect between the support 61 and the nut 180 when the sector 65 of Figure 5 co-operates with the rack 62 and forces the head 14 against the end of the barrel. When this occurs the entire shaft with the movable head 14 slides forward but the gear 12 remains in its normal position.

In Figure 8 the fixed head 30 is shown threaded and mounted upon the shaft next to the bearing or support 194. Interposed between the bearing and the head 30 is a nut 192 and a sleeve 193. On the opposite side of the support 194 is a gear 25 as shown in Figure 1.

The extreme right portion of the shaft 190 is supported by the bearing 200. Next to the bearing 200 is a thrust bearing comprising the two pieces 197 and 199, provided with ball bearings 198.

Figure 9 shows the assembly of the auxiliary shaft. The shaft is supported by the frame bearings 220, 223, 228 and 230. The cam for controlling the movable head is shown at 77 while the two first operation or seaming cams are designated by the letters "A" and the two second operation cams are designated by the letters "B". The worm gear 301 and the clutch mechanism is shown at the extreme right end of the auxiliary shaft, The five cams mounted upon the auxiliary shaft are adjustable therewith by means of the key-ways as shown. The cams are placed in operation when the clutch mechanism of the worm gear and the collar associated with the shaft are thrown into engagement.

The second operation cams, one of which is shown in Figures 14 and 16 comprise a plate 90 and a groove 91 lying between the flange 92 and the plate 95 and collar 99. The plate 95 is of hardened steel to stand the necessary wear. As shown in Figure 14 the cam is provided with a projection illustrated in Figure 15. It is only necessary to provide one of the two operation cams with these projections, which is for the purpose of throwing the clutch mechanism out of engagement as illustrated in Figure 4.

The roll carriers as shown in Figure 11 are supported by means of a casing or bracket illustrated in Figures 12 and 13. As shown these brackets are provided with the openings or bearings 325 for supporting the shaft 100 of the first operation roll carrier and the second operation roll carrier. There are two such brackets or housings provided, each one for supporting one first operation roll carrier and one second operation roll carrier. As shown in Figure 1 one of these supports or brackets serves as a support or bearing for the shaft 170 of the movable head 14, while the other support serves as a bearing for the shaft 190 of the fixed head 30. Figures 7 and 8 show in section at 172 and 194 the upper portion of these brackets supporting the shafts 170 and 190 respectively.

As stated there are five cams mounted upon the auxiliary shaft 222. There are two cams as shown in Figure 14 for controlling the second operation or flattening rolls and in addition there are two similar cams for controlling the first operation or seaming rolls. It has not been thought necessary to illustrate these latter cams but it may be stated that the first operation cams are not provided with a cam as shown in Figure 15. In addition to the four cams mentioned there is a fifth cam shown in Figures 5 and 6 for controlling the longitudinal movement of the movable head 14. As shown in Figs. 9 and 10 the auxiliary shaft supported at 220, 223, 226, 228 and 231 by the main frame of the machine carries the cam 77 for operating the movable head. These operating parts are shown in detail in Figs. 5 and 6 and have been described. The shaft 222 passes through the opening or hole 74, Fig. 6 of cam 77 and is keyed thereto. The shaft 222 also passes through two cams "A" and two cams "B". As shown in Fig. 11 these cams are provided with the hole or opening 93. These cams "A" and "B" are also keyed to the shaft 222 so as to rotate with it. From the foregoing and from the detailed description of Figs. 5, 6, 11, 14, 15, 16, 17 and 18 and the assembly shown in Figs. 9 and 10 it will be seen that the auxiliary shaft 222 carries with it during the rotation the cam 77 for causing the movement of the movable head 14 and the four cams "A" and "B" for causing the operation of the rolls 15 and 23. Each of the cams "A" and "B" are provided with the grooves as shown in Figs. 14 and 16 and arranged as shown in Fig. 11 for causing the operation of the rolls 15 and 23.

Referring to Figure 19, it will be noted that the mitre gear 27, Figure 3, is mounted upon a shaft which carries the worm 300. This worm engages the worm wheel 301, the worm and the wheel being mounted on the case 310 as shown. The worm wheel is provided with an opening 302 through which the shaft 55 passes. The wheel 301 is provided with a clutch comprising the four projections 303. These projections engage openings in the collar 311, Figure 1 which rotates with the shaft 55. When the handle 47 is thrown forward the rod 40, Figure 1, attached to the crank 44, moves backward causing the crank shaft 50 to rotate and to cause the yoke 312, Figure 1 to move forward and cause the openings of the collar 311, to engage the projections 303 of the gear, Figure 19. This engagement causes the auxiliary shaft carrying the five cams to rotate at a predetermined speed.

Each of the four roller cams is provided with an arm as shown in Figures 17 and 18. Each arm carries a roller 81 fastened to the arm by means of a bolt 82 held in place by a nut 84.

As shown in Figure 11 each one of the arms is mounted upon a separate shaft 100. Firmly attached to the shaft 100 and moving with the arm 80 is a roll carrier shown in Figure 11. This carrier is provided with a U shaped opening 108 in which the roll lies. The roll is provided with a pin or shaft passing through the opening 109. The auxiliary shaft passes through the openings 93 of the first and second operation cams for controlling the rolls. During the rotation of the auxiliary shaft and the consequent operation of the cams causes the rolls 81 as shown in Figure 17 to be moved in the grooves 91 Figure 14, thereby causing the rolls to move back and forth at predetermined intervals. The arms of the first or seaming rolls 15 are placed in such a position in the grooves of the respective cams that they are the first to be operated, that is, move toward the heads 14 and 30 which hold the barrel. After a certain cycle of operations or when the first operation rolls have performed their work they move away from the heads 14 and 30 and the second operation or flattening rolls 23 move toward the heads 14 and 30. When the second operation rolls have completed their work they are caused to move away from the heads 14 and 30 by means of their respective cams.

Just before, or at the time the first operation rolls 15 are started in operation the cam for controlling the movable head 14 starts to function. As shown in Figures 5 and 6 the cam 77 starts to rotate in the direction indicated by the arrow. At the first movement, that is, when there is the greatest stress upon the cam, the roller 70 comes into engagement with the hardened steel piece 76 forming a part of the cam. This piece 76 is provided to take care of any unusual wear. As the cam rotates the roller 70 is carried in a downward direction by the groove 75 in which it lies and causes the rack 69 to be drawn in a downward direction. This rack is provided with the teeth 68 which engage corresponding teeth of the sector 65. The sector in turn engages teeth of the rack 62 mounted upon the shaft which carries the movable head 14.

The arrangement of the parts upon the shaft containing the movable head is shown in Figure 7.

When the rack 69 is drawn downward the sector 65 turns toward the right and forces the movable shaft 60 carrying the head 14 toward the right of the machine. As shown in Figure 1, this causes the head 14 to move toward the fixed head 30 and firmly clamp the barrel between the two heads so that it rotates with the heads.

As shown in Figure 20 the heads 315 of the barrel are dish shaped and engage the barrel 316 in the manner shown. The barrel is provided with a flange 317 over which the head or cover 318 laps.

When the head 14 is forced entirely over to the right of the machine the rolls 15 engage the flange of the barrel 317 and the overlapping portion 318 forming a bead or seam as shown in Figure 21. After the barrel has made the required number of revolutions and the bead properly formed, then the rolls 15 disengage the barrel and the rolls 23 engage the barrel and flatten out the seam or bead to cause the barrel to be hermetically sealed.

After the flattening process is completed which will be at the time the roll 70, Figure 6 is at the bottom of the groove 75, the rolls 23 will disengage the barrel. When the cam Figure 6 moves toward the position as shown then the rack 69 moves upward causing the sector 65 to rotate toward the left thereby causing shaft 60 to move toward the left of the machine causing the head 14 to disengage the barrel.

At this time the projection 320, Figure 4 engages the roll 321 causing the arm 322 to move, thereby causing the projections 303 to leave the opening in the collar 311. This disengagement causes the auxiliary shaft containing the cams for controlling the rolls and movable head to come to rest.

Referring to Figure 23 it will be noted that the roller 321 is shown resting in its normal position upon the cam or projection 320 of one of the two operation cams illustrated in Figure 14. The arm 322 containing the roller 321 is provided with a tooth 360 which normally engages a cut out portion 361 of a disk 364 mounted upon the shaft 365. The arm 322 has a projection 362 to which is attached an extension spring 363 serving to cause the roller 321 to press against the projection 320. In starting the operation of the various rolls and when the arm 46 is moved toward the machine the disk 364 moves forward and causes the cut out portion 361 to disengage the tooth 360. As soon as this happens the arm 47 is operated and as the tooth 360 is out of engagement with the cut out portion 361 the breaking effect is removed thereby allowing the roll 321 to leave the projection 320 and engage the flat surface of the second operation cam. When the arm 47 is operated the clutch openings 311 engage the projections 303 of the gear wheel shown in Figure 19. After the auxiliary shaft starts to rotate the handle 46 is operated a second time to cause the tooth 360 to engage the cutout portion 361 when the rolls have completed their function. After this function is performed the tooth 360 engages the cutout portion 361 thereby again rendering it necessary to operate the handle 46 to perform another operation.

In other words, the operation of the handle 46 allows the operation of the handle 47. This co-operation between the two handles is made for the purpose of allowing a mutual operation by the operator between the heading of each barrel.

By referring to Fig. 11 it will be noted that the roller 81 belonging to the arm 80 is shown as being in a position at the top of the groove of the cam. The roller is shown in this position for the sake of clearness. In its normal position the roll is positioned in the groove 91 at the point X as shown at X in Fig. 14.

Having thus described my invention, what I desire to secure by Letters Patent is:

1. In a barrel machine, the combination of two rotatable heads for holding a barrel, said heads normally spaced apart so as to receive the barrel, means comprising a cam-controlled rack for automatically advancing one of said heads so the barrel is tightly clamped between said heads.

2. In a barrel machine, the combination of two rotatable heads for holding a barrel, said heads normally spaced apart so as to receive the barrel, means for automatically advancing one of said heads so the barrel is tightly clamped between said heads, each of said heads being provided with a set of cam-controlled rollers, one roller of each set adapted to perform a certain operation on said barrel while the second set thereafter performs another operation upon the barrel.

3. In a barrel machine, the combination of two rotatable heads adapted to receive a barrel, a plurality of cams mounted upon a common shaft, a set of rollers for each head, means controlled by said cams for causing one roller of each set to perform a certain operation upon the barrel and then causing another roller of each set to perform another operation upon the barrel.

4. In a barrel machine, the combination of two rotatable heads adapted to receive the barrel, means for causing a continuous rotation of said heads, means comprising a cam-controlled rack for automatically advancing one of said heads to tightly engage the barrel, a set of cam-controlled rollers for each head, means for automatically causing one roller of each head to perform an operation upon the barrel, means for thereafter automatically causing another roller of the set to perform another operation upon said barrel, additional means for causing said rollers to come to rest after the second operation has been performed.

5. In a barrel machine, the combination of two rotatable heads adapted to receive a barrel, a pair of rollers associated with each head, means comprising a cam-controlled rack for automatically advancing one of said heads to tightly engage the barrel, cam controlled means thereafter for automatically causing one roller of each pair to perform one operation upon the barrel, cam controlled means for automatically causing the other roller of each pair to perform another operation upon the barrel after the first operation is completed and means for automatically causing the advanced head to withdraw from engagement with the barrel.

6. In a barrel machine, the combination of two rotatable heads mounted upon a main shaft and adapted to receive a barrel, a pair of rollers associated with each of said heads, a cam for each of said rollers mounted upon a common auxiliary shaft, means for rotating said cams in sequence so that one roller of each pair performs one operation upon the barrel, and means thereafter for causing the remaining rollers to perform a second operation upon the barrel.

7. In a barrel machine, the combination of two rotatable heads mounted upon a main shaft and adapted to receive a barrel, a pair of rollers associated with each of said heads, means for rotating said heads, a plurality of cams mounted upon a common auxiliary shaft for causing said rollers to operate in sequence to perform a plurality of operations upon the barrel, and means for thereafter automatically causing the rollers to cease their operation.

8. In a barrel machine, the combination of two rotatable heads adapted to receive a barrel, a pair of rollers associated with each of said heads, one of said heads arranged for a longitudinal movement, means comprising a cam controlled rack for causing the longitudinal movement of said head, means comprising a plurality of cams mounted upon a common shaft for causing one roller of each pair to first engage the barrel and for causing the remaining roller of each pair to engage said barrel, and means for causing the movable head to disengage the barrel after the operation of the two sets of rollers.

9. In a barrel machine, the combination of two normally rotating heads for holding a barrel, a pair of rollers for each head normally at rest, manual means for placing said rollers in position to be operated, a plurality of cams mounted upon a common shaft said cams causing one roller of each pair to first engage the barrel, and for causing the second roller of each pair to engage the barrel, and automatic means brought into play after the second rollers have operated to prevent further operation of any of said rollers.

10. In a barrel machine, the combination of two heads adapted to receive a barrel, two sets of rollers, one set of rollers arranged to perform one operation upon the barrel after which the second set of rollers performs another operation upon the barrel, a plurality of cams mounted upon a common shaft for controlling the operation of said rollers, and means for preventing further operation of the rollers after the second operation.

11. In a barrel machine, the combination of two rotatable heads, a main shaft for causing the rotation of said heads, one of said heads arranged for longitudinal movement, cam-controlled means for causing the movable head to move in a longitudinal direction after a predetermined time for yieldingly engaging a barrel, two sets of rollers associated with said heads, a plurality of cams mounted upon a common shaft, said cams causing one set of rollers to automatically perform one operation upon the barrel and for automatically thereafter causing the other set of rollers to perform a second operation upon the barrel, means for causing the rollers to cease further operations, and additional means for causing the movable head to disengage the barrel.

In testimony whereof I affix my signature.

FRANK G. HOLLAND.